United States Patent
Millerd et al.

(10) Patent No.: US 7,057,738 B2
(45) Date of Patent: Jun. 6, 2006

(54) SIMULTANEOUS PHASE-SHIFTING FIZEAU INTERFEROMETER

(75) Inventors: James E. Millerd, Tucson, AZ (US); James C. Wyant, Tucson, AZ (US)

(73) Assignee: A D Technology Corporation, Tucson, AZ (US)

( * ) Notice: Subject to any disclaimer, the term of this patent is extended or adjusted under 35 U.S.C. 154(b) by 369 days.

(21) Appl. No.: 10/746,228

(22) Filed: Dec. 24, 2003

(65) Prior Publication Data

US 2005/0046864 A1    Mar. 3, 2005

Related U.S. Application Data

(60) Provisional application No. 60/498,522, filed on Aug. 28, 2003.

(51) Int. Cl.
*G01B 9/02* (2006.01)

(52) U.S. Cl. .................................................. 356/495
(58) Field of Classification Search ................ 356/489, 356/495, 511–515
See application file for complete search history.

(56) References Cited

U.S. PATENT DOCUMENTS 3,849,003 A * 11/1974 Velzel ......................... 356/495
4,594,003 A * 6/1986 Sommargren ................ 356/489
4,872,755 A   10/1989 Kuchel
6,304,330 B1  10/2001 Millerd et al.
7,002,694 B1 * 2/2006 Schulte et al. .............. 356/512
2003/0137671 A1 * 7/2003 De Groot et al. ........... 356/512
2005/0200856 A1 * 9/2005 De Groot .................... 356/512

\* cited by examiner

*Primary Examiner*—Gregory J. Toatley, Jr.
*Assistant Examiner*—Patrick Connolly
(74) *Attorney, Agent, or Firm*—Antonio R. Durando

(57) ABSTRACT

The tilted relationship between the reference and test mirrors of a Fizeau interferometer is used to spatially separate the reflections from the two surfaces. The separate beams are filtered through a spatial polarization element that provides different states of polarization to the beams. The beams are subsequently recombined to form a substantially collinear beam that is processed using a spatial-phase-shift interferometer that permits quantitative phase measurement in a single video frame. Alternatively, two beams with orthogonal polarization are injected into the Fizeau cavity at different angles, such that after reflection from the reference and test optics they are substantially collinear. Unwanted reflections are blocked at the focal plane through the use of a circular aperture. Short coherence length light and a delay line may be used to mitigate stray reflections, reduce measurement integration times, and implement temporal phase averaging.

30 Claims, 8 Drawing Sheets

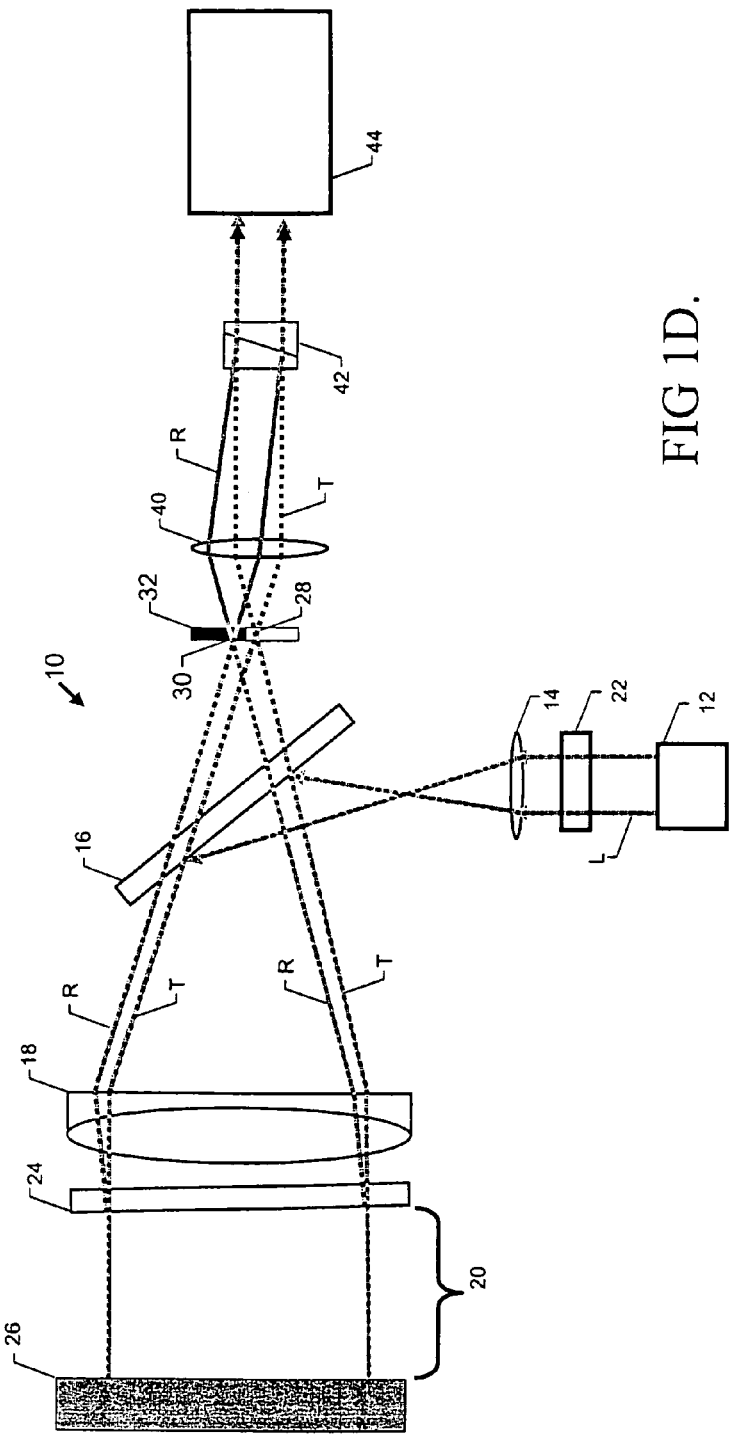
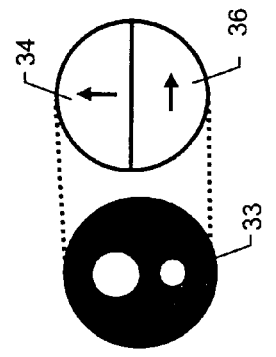
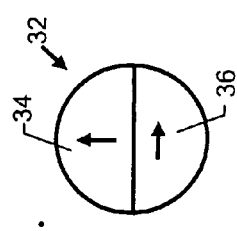

SIMULTANEOUS PHASE-SHIFTING FIZEAU INTERFEROMETER

RELATED APPLICATIONS

This application is based on and claims the priority of U.S. Provisional Application Ser. No. 60/498,522, filed Aug. 28, 2003.

BACKGROUND OF THE INVENTION

1. Field of the Invention

The invention relates to measurement of electromagnetic wavefronts. In particular, it pertains to quantitative, instantaneous measurement of interference light beams produced by a Fizeau interferometer.

2. Description of the Related Art

Light-beam measurements and characterization are important in the manufacture of many optical components, such as data-storage laser heads, for example. Accordingly, many optical interferometric systems have been devised to increase the accuracy and reliability of the measurements. In general, a front-end interferometric device that produces a test and a reference beam is combined with a back-end optical device for resolving phase differences between the beams. This may be achieved simultaneously by encoding (or "marking") the beams at the front end, such as by using different polarization states for the test and reference beams, and resolving them spatially at the back end. Alternatively, the optical path difference between the test and reference surfaces may be varied in time at the front end, such as by scanning one surface with respect to the other, and the phase differences are resolved temporally at the back end.

One of the problems identified in the prior art has been the ability to properly encode the reference and test beams in the measurement portion of a Fizeau-type interferometer. In U.S. Pat. No. 4,872,755, Kuchel et al. addressed this shortcoming by adopting a different approach to both simultaneous and temporal phase measurement. By introducing an optical delay device in the measurement portion of the interferometer and judiciously selecting the coherence length of the light, the length of the delay path, and the length of the gap in the Fizeau cavity, two coherent test and reference beams as well as two incoherent beams are produced simultaneously. The delay device is used to vary the optical path difference between the coherent beams for temporal phase measurements. Alternatively, the test and reference beams may be polarized after they have been produced in the measurement portion of the device and introduced into a spatially-resolving receiver for simultaneous phase measurements.

Thus, the Kuchel et al. approach requires fine adjustment of the length of the delay path, which is difficult and expensive to implement. In addition, the presence of the two incoherent light beams produces significant background light that may affect the measurements. Therefore, there is still a need for a phase measurement system based on a Fizeau interferometer that does not suffer from these shortcomings.

In U.S. Pat. No. 6,304,330, Millerd et al. describe a back-end system wherein the test and reference wavefronts produced by an interferometer are collimated, divided into sub-wavefronts, phase-shifted, combined to produce interference, and detected along a common axis simultaneously on a single detector or a multiple detector array. The beams can also be detected sequentially on a single detector array, if desired. The Millerd optical system also requires encoded test and reference beams. Therefore, in combination with a front-end Fizeau configuration, the same encoding problems addressed by Kuchel et al. need to overcome. The present invention illustrates a novel approach whereby the output of a Fizeau cavity with a tilted reference mirror is combined with a polarizing element to produce coherent test and reference wavefronts suitable for simultaneous spatial phase measurements in a system as described in U.S. Pat. No. 6,304,330.

SUMMARY OF THE INVENTION

The invention utilizes the tilted relationship between the reference and test mirrors of a Fizeau interferometer to spatially separate the reflections from the two surfaces. The separate beams are filtered through a spatial polarization element that provides different states of polarization to the beams, as required for simultaneous phase measurement. The beams are subsequently recombined to form a substantially collinear beam that is processed using a spatial-phase-shift interferometer that permits quantitative phase measurement in a single video frame.

Alternatively, two beams with orthogonal polarization are injected into the Fizeau cavity at different angles, such that after reflection from the reference and test optics they are substantially collinear. Unwanted reflections are blocked at the focal plane through the use of a circular aperture. Short coherence length light and a delay line may be used, as taught by Kuchel et al., to mitigate stray reflections, reduce measurement integration times, and implement temporal phase averaging.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1A is a schematic view of a measurement apparatus according to the invention configured to produce a spatial separation between the test and reference beams using a tilt angle between the test and reference surfaces, and including a polarizing filter to produce orthogonally polarized test and reference beams.

FIG. 1B is a schematic illustration of a polarizing filter with adjacent orthogonally polarizing sections.

FIG. 1C is a schematic illustration of a polarizing filter with a first polarizing section contained in another, orthogonally polarizing section.

FIG. 1D is a schematic illustration of a polarizing filter wherein a dual-aperture mask is added to the polarizing filter of FIG. 1B in order to block additional beams caused by multiple reflections between the test and reference surfaces.

DETAILED DESCRIPTION OF THE INVENTION

Figure 2:
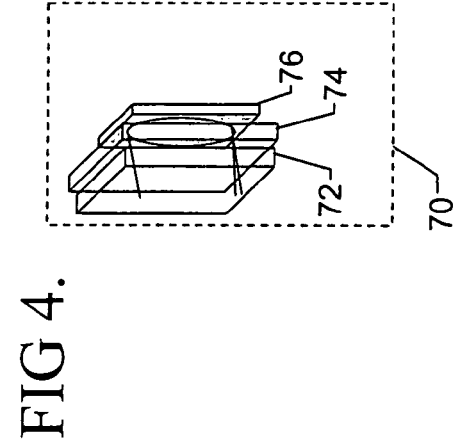
FIG. 2 is a schematic representation of a generic spatial phase-shifting interferometer module suitable for combination with the optical device of the invention.

In general, the invention lies in the idea of spatially separating the test and reference beams produced by a Fizeau type of interferometer and passing each beam through an encoding filter. By imparting orthogonal states of polarization to the test and reference beams, they may be recombined and processed in a spatial-phase-shift interferometer for simultaneous phase measurements.

For the purposes of the invention, "tilt angle" refers to the angle between the test and reference surfaces in a Fizeau interferometer measured with respect to a perfect parallel condition. As such, tilt angles are used in the invention to provide fringes with an appropriate degree of resolution for the interferometric task at hand.

The concept of the invention is exemplified by the interferometric device 10 of FIG. 1A. A source 12 of collimated light L is expanded with an expansion lens 14, reflected off a beamsplitter 16, collimated by a collimation lens 18, and directed toward an interferometer 20 in Fizeau configuration. Since the input beam L contains both horizontal and vertical polarizations, a half-wave plate 22 can be used to vary the ratio of light in each polarization state (vertical or horizontal). As is well understood in the art, the light in the interferometer is reflected from both the reference surface 24 and the test surface 26 to produce corresponding reference and test beams R and T, respectively. The reference and test surfaces of the interferometer are tilted with respect to one another, so as to produce reference and test beams R.T that are spatially separate, as illustrated in the figure (where the test surface 26 is normal to the incoming collimated beam and the test surface 24 is tilted toward it). As a result of this tilt, the light T reflected from the test surface 26 follows the optical path of the incoming light and, after passing through the beamsplitter 16, is focused at a point 28 in the focal plane of the collimation lens 18. The light R reflected from the back surface 24 of the reference optic is displaced by the tilt in the surface and is accordingly focused at a different point 30 of the focal plane of the collimation lens.

According to the invention, a spatial polarization filter 32 is placed at the focal plane of the collimation lens 18. As illustrated in FIG. 1B, the polarization filter 32 includes two regions with different polarization components (preferably orthogonal to each other) positioned such that the test beam T and the reference beam R are transmitted through the different regions. Thus, as a result of interaction with the polarization elements, each beam emerges with orthogonal polarization. In the embodiment of FIG. 1B, the polarization filter 32 consists of a first linear-polarizer region 34 and a second linear-polarizer region 36 that abut each other and have axes of polarization oriented orthogonally with respect to each other. In another embodiment 38, shown in FIG. 1C, the second polarizer region 36 is completely circumscribed by the first polarizer region 34. Such a device can be manufactured, for example, as a patterned polarizer (available from Codixx of Barleben, Germany). In the preferred embodiment, illustrated in FIG. 1D, a dual-aperture mask 33 is used in combination with the linear polarizer regions 34, 36 of FIG. 1B to block the multiple reflections generated between the reference and test surfaces 24, 26.

To permit operation of the interferometer over a wide acceptance angle, the thickness of the polarizers should preferably be less than the quantity $1.5\lambda(NA)^2$, where $\lambda$ is the wavelength of the light and NA is the numerical aperture of the collimation lens 18. As one skilled in the art would readily understand, greater thicknesses would require more tilt, which tends to introduce more aberrations through the optical system and would, accordingly, require greater calibration. It is understood that other, equivalent polarization means may be used instead of the filters illustrated in FIGS. 1B–1D, such as two quarter waveplates with their respective axes oriented 90 degrees with respect to each other. Combinations of other birefringent and polarization elements are similarly possible and well understood in the art.

At the back end of the interferometric device 10, an imaging lens 40 is used to convert the spatial separation between the test and reference beams T,R into an angular separation. A polarization beamsplitter 42 is used to recombine the beams to produce substantially collinear and coextensive wavefronts. The beams are then processed by a spatial phase-shifting interferometer module 44. FIG. 2 illustrates generically a polarization phase-shifting interferometer 44 wherein the incoming wavefronts are subjected to four sequential processing steps while retaining their common path. The first step, occurring in a splitting/imaging section 46 of the interferometer, produces a plurality of copies T', R' of the test and reference wavefronts using refractive, diffractive and/or reflective optical splitters. The second step utilizes a phase-shifting section 48 to impart different relative phase shifts between the copies of the reference and test wavefronts. In the next step, carried out in an interference section 50, the phase-shifted copies of the reference and test wavefronts are combined to produce interferograms through interaction with appropriate polarizing elements. Finally, in the final step, a detector section 52 with a plurality of photo-detectors is used to spatially sample the resulting interferograms.

Figure 3:
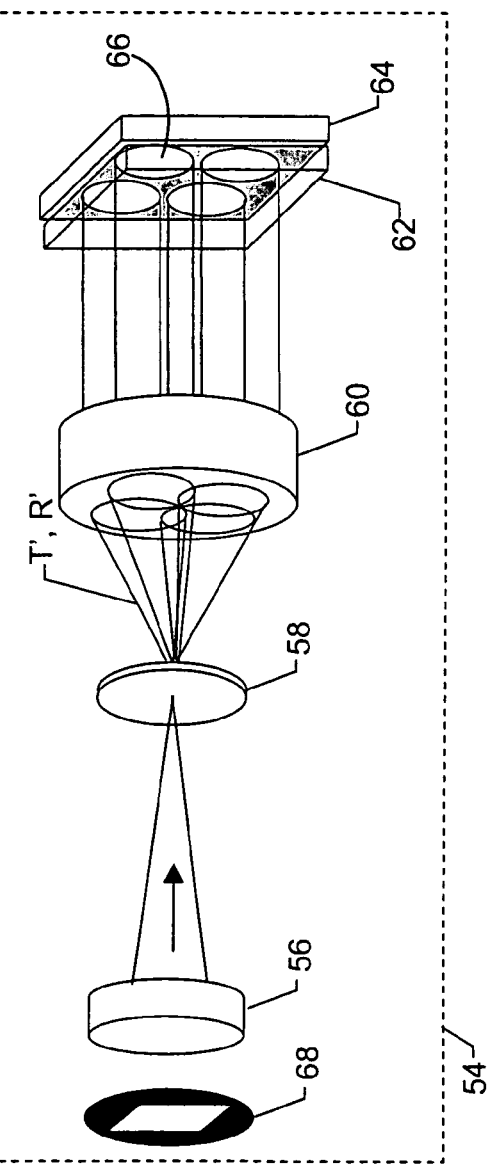
FIG. 3 is a schematic view of a phase-shifting interferometer module wherein the orthogonally polarized reference and test beams are focused by a lens onto a beamsplitter that produces a plurality of sub-image beam pairs, which are then collimated and imaged by a lens onto a detector through a phase interference plate.

As described in copending U.S. Ser. No. 10/652,903, hereby incorporated by reference, spatial phase-shifting interferometer module 44 suitable for the invention can be implemented in various arrangements. For example, FIG. 3 illustrates an embodiment 54 wherein the orthogonally polarized reference and test beams are focused by a lens 56 onto an appropriately positioned beamsplitter element 58. The beamsplitter, through reflective, refractive or diffractive elements, produces a plurality of sub-image beam pairs (reference plus test) which are collimated and imaged by a lens 60 through a phase interference plate 62 onto a detector 64. The plate 60 phase shifts and appropriately overlaps the collimated sub-image beams, thereby delivering phase-shifted interferograms 66 on the detector 64. The plate 62 comprises substantially planar birefringent waveplates and polarizing elements arranged in parallel and/or adjoining layers, as is known in the art.

The entrance region of the interferometer 54 preferably incorporates a field stop 68 that is conjugate with an input pupil image plane and the plane of detector 64. The purpose of the field stop 68 is to limit overlap between sub-images on the detector. The detector 64 is typically a pixilated array that allows high-resolution digital sampling of the phase-shifted interferograms. The digitized interferograms are then processed by a computer in conventional manner to characterize the test surface using one of the many well known algorithms for phase determination.

Figure 4:
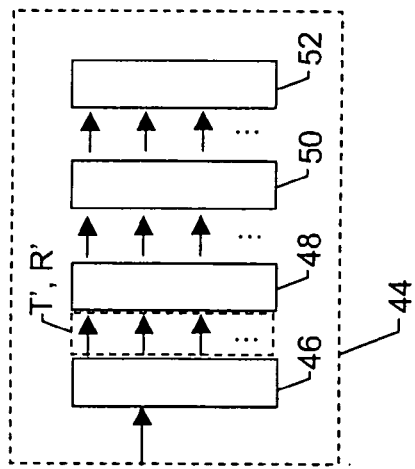
FIG. 4 illustrates a spatial phase-shifting interferometer that employs a spatial-frequency carrier method of detecting the phase variations in the test wavefront.

In another embodiment 70 shown in FIG. 4, the spatial phase-shifting interferometer employs a spatial-frequency carrier method of detecting the phase variations in the test wavefront. The reference and test beams are collimated as described above and directed to a polarization element 72 (which may be a birefringent crystal, such as a Wollaston prism, or any other refractive or diffractive component) inside the interferometer 70. The element 72 acts as a polarization beamsplitter, thus introducing an angular separation between corresponding wavefronts. The waves are then interfered by a polarizer 74 and imaged on a single detector 76. The contrast of the corresponding interferograms can be adjusted by rotating the polarizer 74 to compensate for arbitrary polarizations of the imaged reference and test waves. The digitized interferograms are further processed by computer to calculate phase and characterize the test surface.

Figure 5:
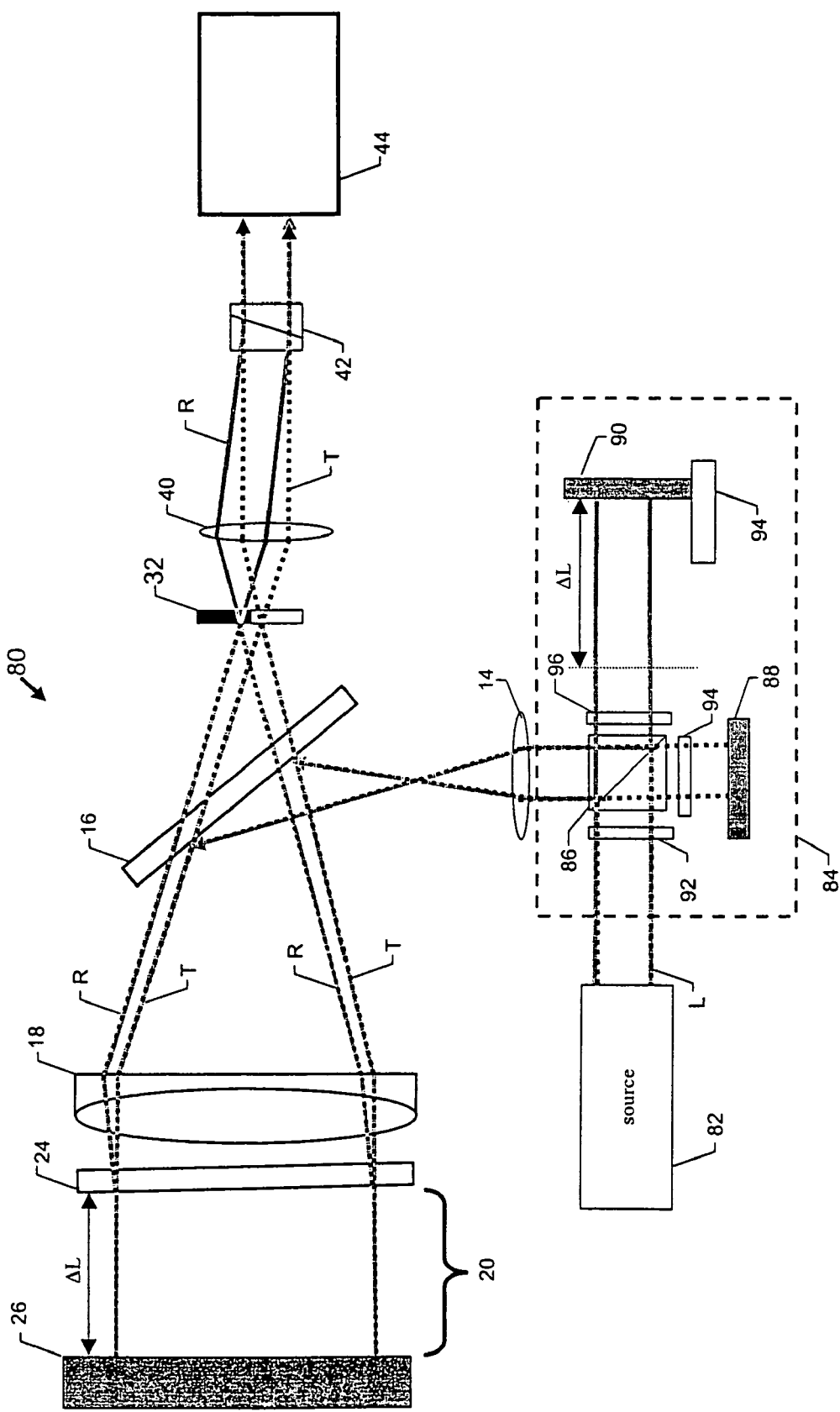
FIG. 5 is a schematic representation of the apparatus of FIG. 1 with an optical delay line affecting the input light.

In another embodiment 80 of the invention illustrated in FIG. 5, an optical delay line 84 is used to generate two beams separated by an optical path delay AL, as taught by Kuchel et al. The input beam L is directed by a beamsplitter 86 toward two mirrors 88 and 90 along preferably orthogonal optical paths differing in length by the amount AL. The two reflected beams are then redirected by the beamsplitter and injected into the Fizeau interferometer described in FIG. 1, where they are both reflected from the reference surface 24 and the test surface 26. At the focal plane of the primary lens 18, the reflected beams are transmitted through the spatial polarization filter 32, which transmits the test beam T and the reference beam R in selected orthogonal polarizations, as explained above. The test and reference beams may then be detected for temporal phase shifting, or phase shifted and processed as illustrated in FIGS. 2–4.

The use of a short coherence light source (less than twice the optical length of the cavity) in the embodiment 80 of FIG. 5 results in the suppression of reflections produced by optics other than the test and reference surfaces. The length of the delay line 84 is adjusted to produce the same path delay as in the Fizeau cavity 20, so that the reference beam R and the test beam T are temporally coherent and yield high-contrast interference fringes in the spatial phase-shift interferometer 44. Thus, spurious reflections from the imaging optics are greatly reduced. In addition, the broad-band source, because of its short coherence length, makes it possible to select different surfaces of the test optic for independent measurements, such as the front and back surfaces of a test platen. An additional advantage derived from the use of broad-band light is the fact that the rotating ground glass typically used in Fizeau interferometers to produce spatially incoherent beams may be eliminated, thereby generating higher light levels at the detector and correspondingly shorter integration-time requirements. Multiple measurements may be acquired and averaged with a random phase offset in order to reduce residual phase-dependent errors in the system, as taught in Ser. No. 10/652,903.

The interferometric device 80 also provides advantages over the system disclosed by Kuchel et al. because only two beams remain to interfere after the filter 32 of the present invention, which yields higher contrast interference patterns. An entrance waveplate 92 may also be provided to adjust the contrast of the pattern to near unity for all combinations of reference and test object reflectivity. Finally, the delay line may be combined with a piezoelectric or other scanning element 94 to systematically introduce small phase-shifts in the delay line so that multiple phase maps can be averaged to reduce phase-dependent errors in the final phase map or to use conventional temporal phase shifting for applications utilizing large Fizeau interferometers, where piezo-shifting of the reference optic is not possible.

It is noted that the beams produced by the delay line 84 may also be polarized to have orthogonal polarizations, although the feature is not necessary to practice the invention. To that end, the beamsplitter needs to be a polarizing beamsplitter and additional polarizing elements, such as waveplates 94 and 98, are introduced in the optical paths of the two beams directed toward the mirrors 88 and 90, respectively, of the delay line. As one skilled in the art would readily recognize, this configuration allows all of the light in the input beam L to be transmitted toward the Fizeau cavity, thereby improving energy efficiency and further reducing integration-time requirements.

Figure 6A:
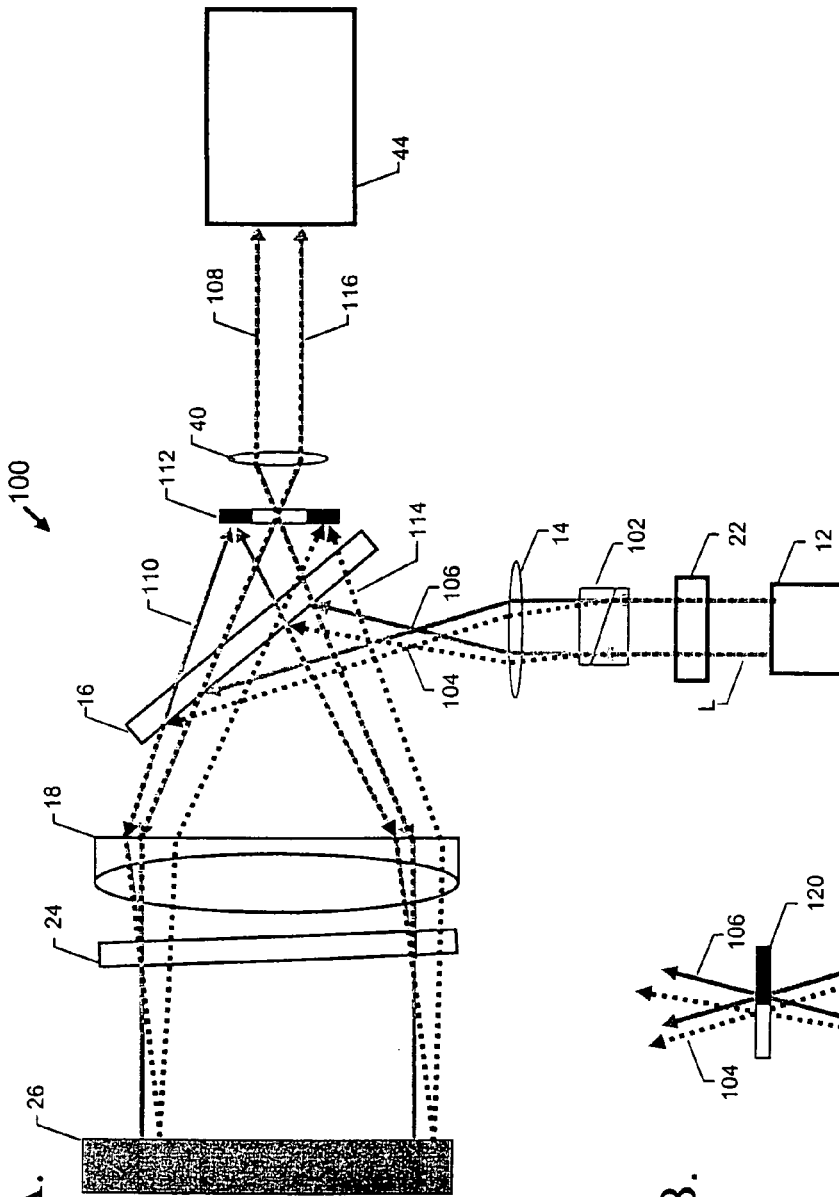
FIG. 6A is a schematic representation of another embodiment of the invention configured to produce a spatial separation between the test and reference beams using a polarizing beamsplitter operating on the input light beam, and including an aperture adapted to transmit on-axis beams and block off-axis beams directed toward the phase-shifting interferometer module.

In another embodiment 100 of the invention shown in FIG. 6A, a polarization beamsplitter 102 is placed in the input channel to generate two input beams 104 and 106 that have orthogonal polarizations and are spatially displaced from one another. The two beams are injected into the Fizeau cavity 20 with the tilted reference surface 24. The separation of the two beams is judiciously selected so that the first beam 104 is reflected from the reference surface to form a beam 108 that is directed on-axis toward the spatial phase-shift interferometer 44, while the second beam 106 is reflected to form a beam 110 that is directed off-axis toward the interferometer. Accordingly, an aperture 112 can be used to block the reflection of the second beam 106 (beam 110) and transmit the reflection of the first beam 116 (beam 108). The test surface 26 similarly reflects the first input beam 104 to form an off-axis beam 114 which is blocked by the aperture 112 and reflects the second input beam 106 to form an on-axis beam 116 that is transmitted by the aperture 112. Beams 108 and 116 are substantially collinear and orthogonally polarized. Thus, they may be subsequently processed by the spatial phase-shifting interferometer module 44. This embodiment has the advantage of not requiring the introduction of a polarizing beam splitter in the imaging section of the interferometer. A disadvantage lies in the loss of light in the beams blocked by the aperture element.

Figure 6B:
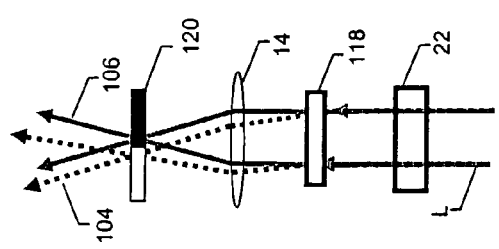
FIG. 6B is a schematic view of an alternative to the polarizing beamsplitter of FIG. 6A.

FIG. 6B shows another embodiment of the invention that is closely related to the one of FIG. 6A. The polarization beamsplitter 102 at the input of the device is constructed using a diffraction grating 118, the expansion lens 14, and a polarization filter mask 120. The combination of the these elements produces the orthogonally polarized input beams 104 and 108 that are then introduce into the tilted Fizeau cavity of FIG. 6A.

Figure 7:
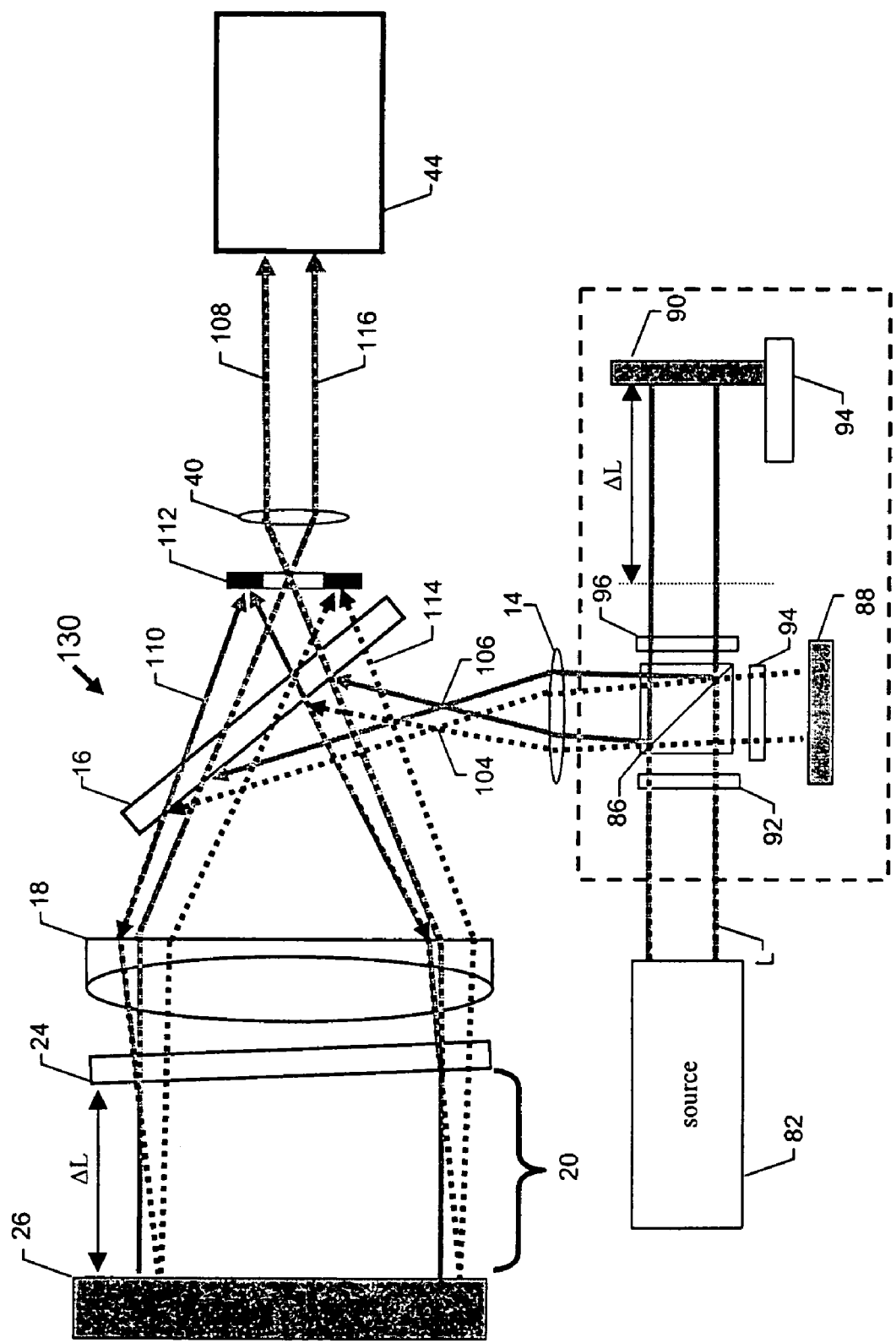
FIG. 7 is a schematic representation of the apparatus of FIG. 6A with an optical delay line affecting the input light.

FIG. 7 shows another embodiment 130 closely related to the one illustrated in FIG. 6A. The polarized input beams 104 and 106 are generated from a short coherence length source 82 that is used in combination with an optical delay line 84. The input beam L is separated by a polarization beamsplitter 86 into two beams in the delay line as described above with reference to the embodiment 80 of FIG. 5. Thus, the two beams are encoded by orthogonal polarizations and beam 104 has an additional optical delay ΔL introduced in its path. In addition, the beamsplitter 86 is used also to impart a spatial separation on the beams 104 and 106 directed toward the Fizeau cavity. After reflection from the mirrors 88 and 90 in the delay line, the two beams are directed toward the Fizeau cavity by the beamsplitter 86 with an appropriate angle between the two beams to achieve the spatial separation required to block the unwanted reflection from each beam, as described above with reference to the embodiment 90 of FIG. 6A. The expansion lens 14 is used to couple the beams into the Fizeau cavity. This embodiment has all the advantages of both embodiments 80 and 90 described above. The main disadvantage is loss of light and the additional complexity of the device.

Figure 8:
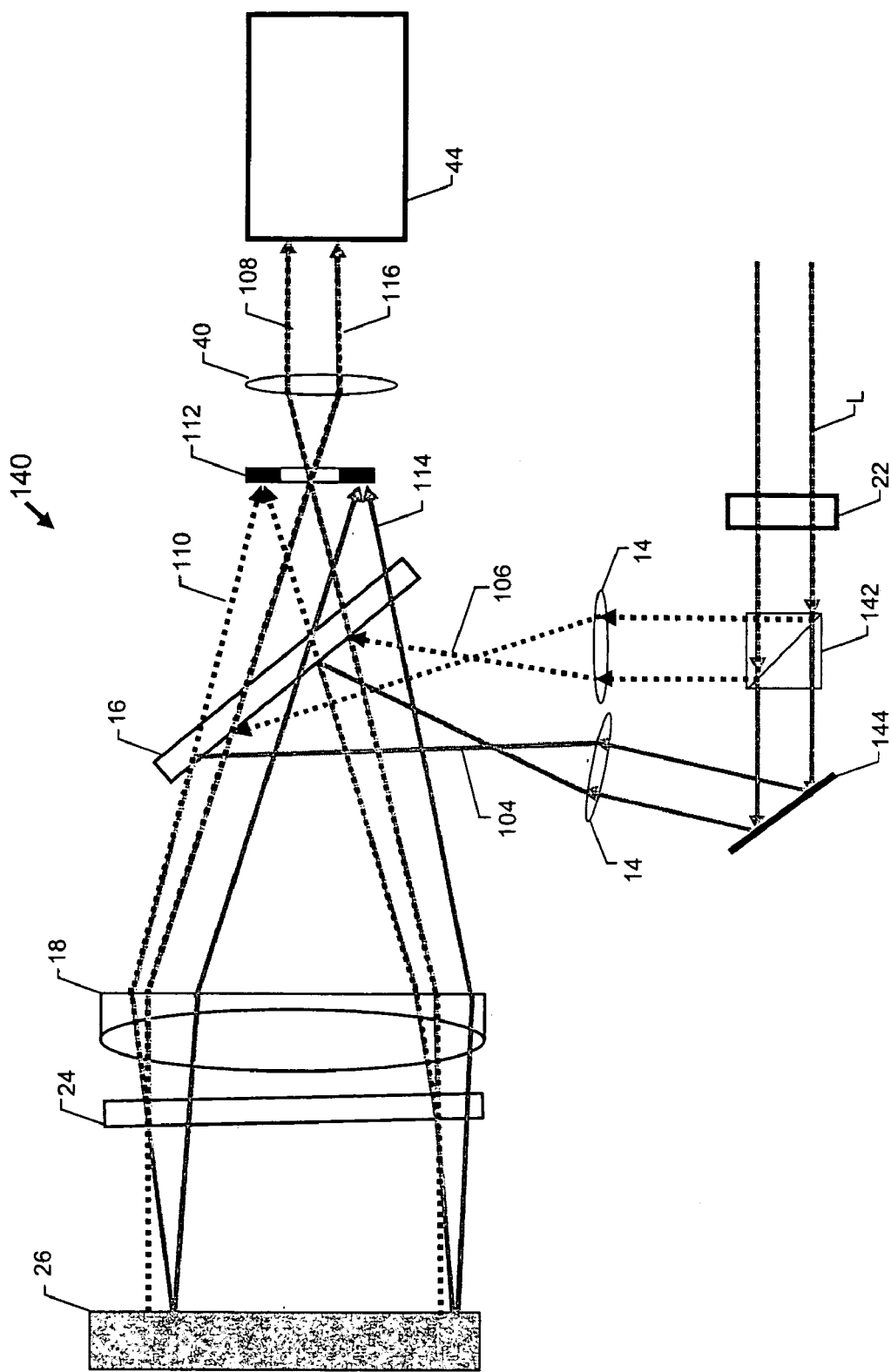
FIG. 8 is a schematic view of another exemplary embodiment of the invention wherein the spatial separation between the test and reference beams is provided using a beamsplitter/mirror combination.

Yet another embodiment 140 of the invention is shown in FIG. 8, wherein the orthogonally polarized input beams 104 and 106 are generated using separate beam paths. The source light L is split by a polarizing beamsplitter 142 into the two orthogonally polarized beams 104,106 which are then directed toward the Fizeau cavity. A mirror 144 is used to provide the spatial separation necessary to practice the invention.

Figure 9:
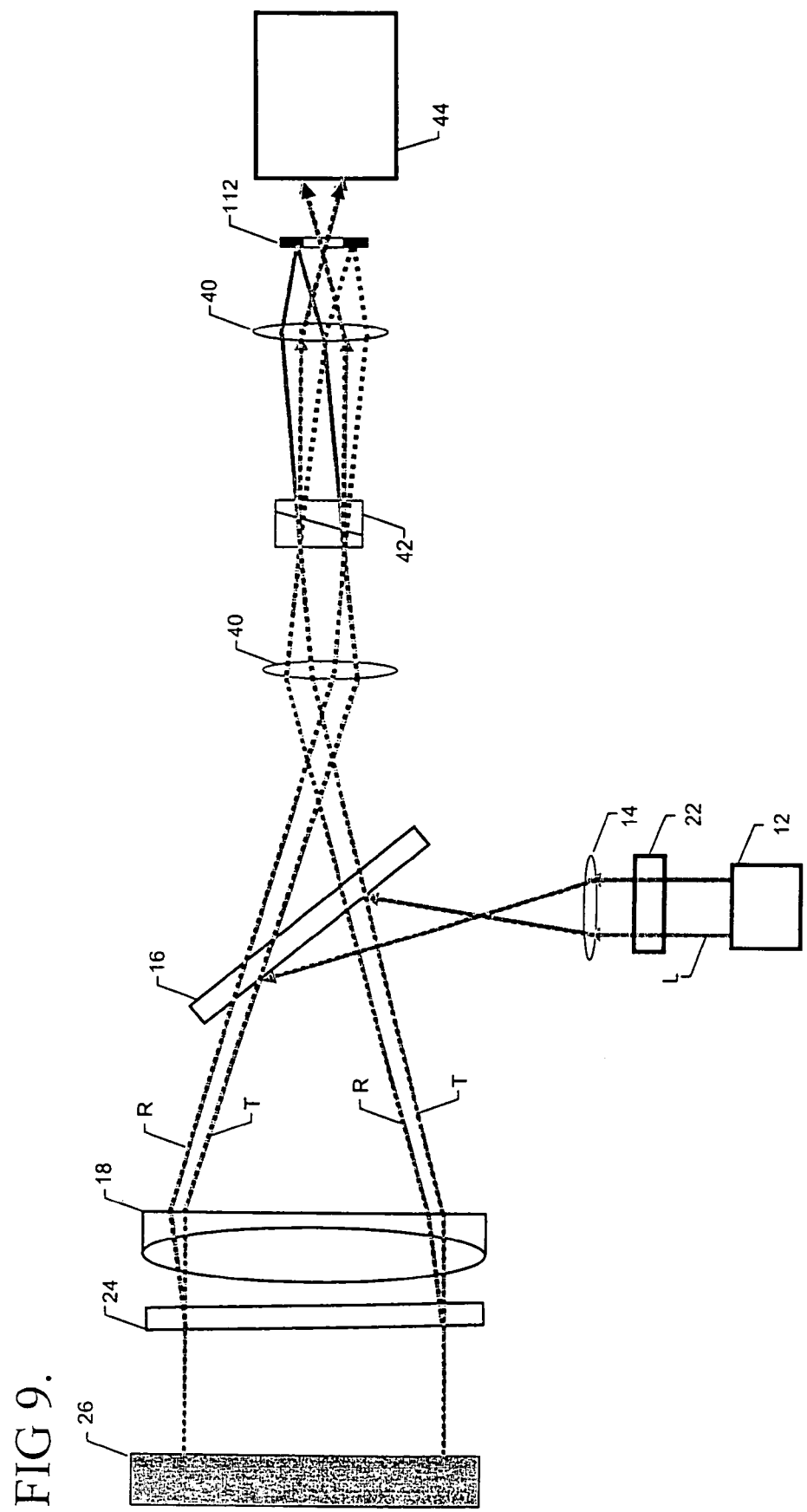
FIG. 9 is a schematic view of another exemplary embodiment of the invention wherein the position of the polarizing beamsplitter and of the blocking aperture are relocated to other conjugate image planes in the imaging system.
Figure 10:
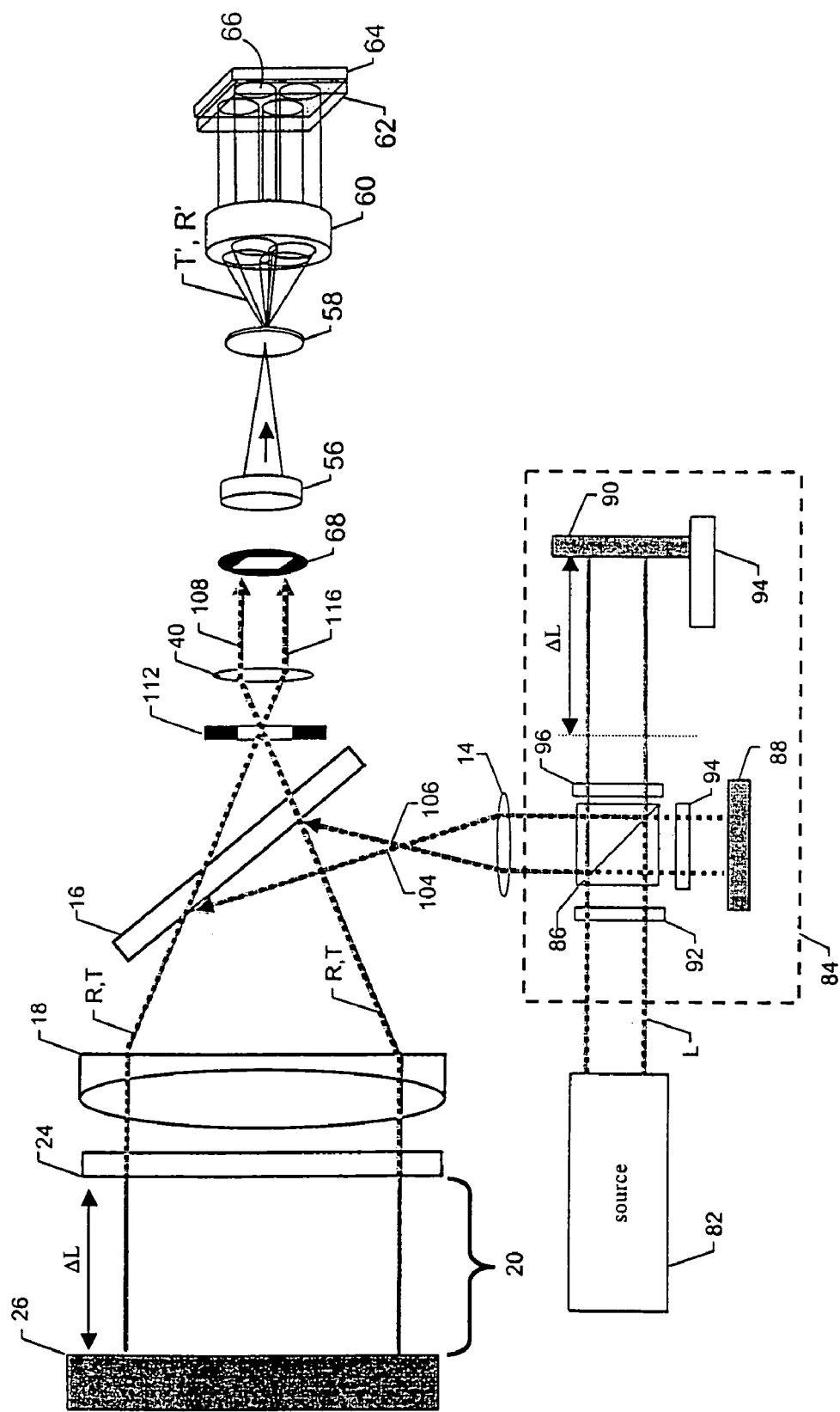
FIG. 10 is a schematic view of an optical device wherein the delay line and polarizing beamsplitter of FIG. 5 are combined with the spatial phase-shifting interferometer of FIG. 3 to characterize a test surface disposed in parallel to the reference surface in a Fizeau interferometer configuration.

Various other changes in the details, steps and components that have been described may be made by those skilled in the art within the principles and scope of the invention herein illustrated and defined in the appended claims. For example, the position of the polarization spatial filter 32 in FIG. 1A, may be relocated by utilizing a series of transfer optics. A series of transfer optics can be used to relocate both the position of the polarizing beamsplitter 42 and the blocking aperture 112 of the embodiment of FIG. 6A to other conjugate image planes in the imaging system, as illustrated in FIG. 9. Similarly, as shown in FIG. 10, a the delay line and polarizing beamsplitter of FIG. 5 may be combined with the spatial phase-shifting interferometer of FIG. 3 to characterize a test surface disposed in parallel to the reference surface in a Fizeau interferometer configuration.

Therefore, while the present invention has been shown and described herein in what is believed to be the most practical and preferred embodiments, it is recognized that departures can be made therefrom within the scope of the invention, which is not to be limited to the disclosed details but is to be accorded the full scope of the claims to embrace any and all equivalent methods and products.

We claim:

1. An optical device coupled to a spatial phase-shifting interferometer module for characterizing a test surface disposed at a tilt angle with respect to a reference surface in an optical cavity wherein an input light beam is reflected by said test and reference surfaces to produce corresponding test and reference light beams, comprising:
   means for producing a spatial separation between said test and reference light beams;
   means for polarizing said test and reference light beams with respectively orthogonal polarization states; and
   means for eliminating said spatial separation between the test and reference light beams and for producing a combination thereof in a collimated beam.

2. The optical device of claim 1, wherein said means for producing a spatial separation between the test and reference light beams includes said tilt angle between the test and reference surfaces; and wherein said means for polarizing the test and reference light beams includes a polarizing filter with two polarizing elements producing orthogonal polarization states.

3. The optical device of claim 2, wherein one of said polarizing elements is circumscribed by the other of said two polarizing elements.

4. The optical device of claim 1, further comprising an optical delay line operating on said input light beam to generate two beams temporally separated by a predetermined optical path delay.

5. The optical device of claim 4, further comprising a means for varying said optical path delay.

6. The optical device of claim 2, further comprising an optical delay line operating on said input light beam to generate two beams temporally separated by a predetermined optical path delay.

7. The optical device of claim 6, further comprising a means for varying said optical path delay.

8. The optical device of claim 1, wherein said means for eliminating the spatial separation between the test and reference beams and for producing a combination thereof in a collimated beam includes an imaging device converting said spatial separation into an angular separation and a polarization beamsplitter recombining the test and reference beams to produce said collimated beam.

9. The optical device of claim 1, wherein said means for producing a spatial separation between the test and reference light beams includes a beamsplitter operating on said input light beam and producing two spatially separated light beams such that each of said light beams, upon reflection from said test and reference surfaces, yields an on-axis beam directed along an optical axis of said spatial phase-shifting interferometer module and an off-axis beam directed away from said optical axis thereof.

10. The optical device of claim 9, wherein said means for polarizing the test and reference beams includes polarizing elements in said beamsplitter.

11. The optical device of claim 9, further including an aperture transmitting said on-axis beam and blocking said off-axis beam.

12. The optical device of claim 9, further comprising an optical delay line operating on said input light beam to generate said two spatially separated light beams with a predetermined optical path delay therebetween.

13. The optical device of claim 12, further comprising a means for varying said optical path delay.

14. The optical device of claim 1, wherein said means for producing a spatial separation between the test and reference light beams includes a beamsplitter and a mirror operating on said input light beam and producing two spatially separated light beams such that each of said light beams, upon reflection from said test and reference surfaces, yields an on-axis beam directed along an optical axis of said spatial phase-shifting interferometer module and an off-axis beam directed away from said optical axis thereof.

15. The optical device of claim 14, wherein said means for polarizing the test and reference beams includes polarizing elements in said beamsplitter.

16. The optical device of claim 14, further including an aperture transmitting said on-axis beam and blocking said off-axis beam.

17. A method of characterizing a test surface with an optical device coupled to a spatial phase-shifting interferometer module wherein said test surface is disposed at a tilt angle with respect to a reference surface in an optical cavity and an input light beam is reflected by said test and reference surfaces to produce corresponding test and reference light beams, comprising the following steps:
  producing a spatial separation between said test and reference light beams;
  polarizing the test and reference light beams with respectively orthogonal polarization states;
  eliminating said spatial separation between the test and reference light beams and producing a combination thereof in a collimated beam; and
  processing said collimated beam in the spatial phase-shifting interferometer module to carry out phase measurements.

18. The method of claim 17, wherein said step of producing a spatial separation between the test and reference light beams is carried out with said tilt angle between the test and reference surfaces; and wherein said step of polarizing the test and reference light beams is carried out with a polarizing filter including two polarizing elements that produce orthogonal polarization states.

19. The method of claim 18, wherein one of said polarizing elements is circumscribed by the other of said two polarizing elements.

20. The method of claim 17, further comprising the step of providing an optical delay line operating on said input light beam to generate two beams temporally separated by a predetermined optical path delay.

21. The method of claim 20, further comprising a means for varying said optical path delay.

22. The method of claim 17, wherein said step of eliminating the spatial separation between the test and reference beams and producing a combination thereof in a collimated beam includes using an imaging device to convert said spatial separation into an angular separation and a polarization beamsplitter to recombine the test and reference beams to produce said collimated beam.

23. The method of claim 17, wherein said step of producing a spatial separation between the test and reference light beams is carried out with a beamsplitter operating on said input light beam to produce two spatially separated light beams such that each of said light beams, upon reflection from said test and reference surfaces, yields an on-axis beam directed along an optical axis of said spatial phase-shifting interferometer module and an off-axis beam directed away from said optical axis thereof.

24. The method of claim 23, wherein said step of polarizing the test and reference beams is carried out with polarizing elements in said beamsplitter.

25. The method of claim 23, further including the step of providing an aperture transmitting said on-axis beam and blocking said off-axis beam.

26. The method of claim 23, further comprising the step of providing an optical delay line operating on said input light beam to generate said two spatially separated light beams with a predetermined optical path delay therebetween.

27. The method of claim 26, further comprising the step of providing a means for varying said optical path delay.

28. The method of claim 17, wherein said step of producing a spatial separation between the test and reference light beams is carried out with a beamsplitter and a mirror operating on said input light beam and producing two spatially separated light beams such that each of said light beams, upon reflection from said test and reference surfaces, yields an on-axis beam directed along an optical axis of said spatial phase-shifting interferometer module and an off-axis beam directed away from said optical axis thereof.

29. The method of claim 28, wherein said step of polarizing the test and reference beams is carried out with polarizing elements in said beamsplitter.

30. The method of claim 28, further including the step of providing an aperture transmitting said on-axis beam and blocking said off-axis beam.

* * * * *